US006951401B2

(12) United States Patent
Van Hees et al.

(10) Patent No.: US 6,951,401 B2
(45) Date of Patent: Oct. 4, 2005

(54) COMPACT ILLUMINATION SYSTEM AND DISPLAY DEVICE

(75) Inventors: Antonius Johannes Maria Van Hees, deceased, late of Veldhoven (NL); by H. J. Kunnen, legal representative, Valkenswaard (NL); Christoph Gerard August Hoelen, Eindhoven (NL); Nicola Bettina Pfeffer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/479,128

(22) PCT Filed: Jun. 3, 2002

(86) PCT No.: PCT/IB02/01989

§ 371 (c)(1),
(2), (4) Date: Jul. 16, 2004

(87) PCT Pub. No.: WO02/097324

PCT Pub. Date: Dec. 5, 2002

(65) Prior Publication Data

US 2005/0007753 A1 Jan. 13, 2005

(30) Foreign Application Priority Data

Jun. 1, 2001 (EP) ............................................ 01202137

(51) Int. Cl.$^7$ ............................................... F21V 8/00
(52) U.S. Cl. ......................................... 362/31; 362/555
(58) Field of Search ........................... 362/31, 555, 561

(56) References Cited

U.S. PATENT DOCUMENTS

| | | | | | |
|---|---|---|---|---|---|
| 5,673,128 A | * | 9/1997 | Ohta et al. | ..................... | 349/62 |
| 5,921,652 A | * | 7/1999 | Parker et al. | ................. | 362/31 |
| 6,039,452 A | * | 3/2000 | Iimura | ......................... | 362/31 |
| 6,361,180 B1 | * | 3/2002 | Iimura | ......................... | 362/31 |
| 6,464,365 B1 | * | 10/2002 | Gunn et al. | .................... | 362/27 |
| 6,536,914 B2 | * | 3/2003 | Hoelen et al. | ............. | 362/231 |
| 6,648,486 B2 | * | 11/2003 | Harbers et al. | ............... | 362/31 |
| 6,796,700 B2 | * | 9/2004 | Kraft | .......................... | 362/560 |

* cited by examiner

*Primary Examiner*—Laura K. Tso

(57) ABSTRACT

A compact backlighting system for illuminating a display device (12) comprises a light-emitting panel (1) having a front wall (2), an opposing rear wall (3) and edge areas (4). At least one of the edge areas (4) is capable of transmitting light. The backlighting system includes a light source (6) comprising at least one LED, and a light-mixing panel 5 for mixing the light originating from the light source (6). Light originating from the light source (6) is coupled into the light-mixing panel (5) via a light input surface (7), which light is mixed in the light-mixing panel (5) and coupled out via a light output surface (8). The light-mixing panel (5) and the light-emitting panel (1) are arranged so as to extend substantially parallel to each other. Between the light-mixing panel 5 and the light-emitting panel 1, the backlighting system comprises a light transport chamber (9) for transporting the light from the light-mixing panel (5) to the light-emitting panel (1). Preferably, the light transport chamber (9) has elliptical, reflective inner wall (10).

18 Claims, 9 Drawing Sheets

COMPACT ILLUMINATION SYSTEM AND DISPLAY DEVICE

The invention relates to an illumination system for illuminating a display device, which illumination system is provided with a light source and a light-emitting panel, wherein the light source comprises at least one light-emitting diode, the light-emitting panel comprises a front wall, a rear wall situated opposite said front wall, and at least one light-transmitting edge area, and the light-transmitting edge area is situated between the front wall and the rear wall of the light-emitting panel.

The invention also relates to a display device comprising said illumination system.

Such illumination systems are known per se and are alternatively referred to as edge lighting systems. They are used, inter alia as a backlighting for (image) display devices, for example for television receivers and monitors. Such illumination systems can particularly suitably be used as backlights for non-emissive displays, such as liquid crystal display devices, also referred to as LCD panels, which are used in (portable) computers or (cordless) telephones.

Said display devices generally include a substrate provided with a regular pattern of pixels, which are each driven by at least one electrode. In order to reproduce an image or datagraphic representation in a relevant area of a (display) screen of the (image) display device, the display device uses a control circuit. In a LCD device, the light originating from the backlight is modulated by means of a switch or a modulator, while applying various types of liquid crystal effects. In addition, the display may be based on electrophoretic or electromechanical effects.

In the illumination systems mentioned in the opening paragraph, customarily a tubular low-pressure mercury-vapor discharge lamp, for example one or more cold cathode fluorescent lamps (CCFL) are used as the light source, the light emitted, in operation, by the light source being coupled into the light-emitting panel which serves as an optical waveguide. This optical waveguide generally forms a comparatively thin and flat panel which is made, for example, of a synthetic resin material or glass, light being transported through the optical waveguide under the influence of (total) internal reflection.

Such an illumination system may also be provided with an alternative light source in the form of a plurality of optoelectronic elements, also referred to as electro-optic elements, such as electroluminescent elements, for example light-emitting diodes (LEDs). These light sources are generally provided in the proximity of, or are contiguous with, a light-transmitting edge area of the light-emitting panel, so that, in operation, light originating from the light source is incident on the light-transmitting edge area and spreads in the panel.

U.S. Pat. No. 5,921,652 discloses an illumination system for illuminating an LCD panel. For the light source use is made of light-emitting diodes (LEDs) which couple light into a light-emitting panel, also referred to as light pipe, via a so-termed light transition area. In the light transition area the light is mixed.

An illumination system of the above-mentioned type has the disadvantage that too much space is necessary to mix light.

It is an object of the invention to completely or partly overcome the above-mentioned drawback. In accordance with the invention, this object is achieved in that the illumination system comprises a light-mixing panel for mixing light originating from the light source, the light-mixing panel being provided with a light input edge area for coupling light originating from the light source into the light-mixing panel, and with a light output edge area for coupling light out of the light-mixing panel, in operation, light originating from the light source being incident on the light input edge area of the light-mixing panel and spreading in the light-mixing panel, a light-transport chamber for transporting light from the light-mixing panel to the light-emitting panel being situated between the light-mixing panel and the light-emitting panel, the light-mixing panel and the light-emitting panel being arranged so as to extend substantially parallel to each other.

By arranging the light-mixing panel so as to extend substantially parallel to the light-emitting panel, a compact illumination system is obtained. In general, it is desirable that a(n) (image) display device is as compact as possible, i.e. the edges surrounding the (LCD) display screen take up the least possible amount of space. Apart from a saving in material and hence a saving in costs, this also enables various display screens to be positioned next to one another (in one plane), said display screens being arranged so as to substantially contact each other. In addition, the (electrical) drive (for driving the pixels) of the display device must be arranged so as to bypass the illumination system, but if the illumination system takes up too much space, then these (standard) drive wires may be too short. If the light-mixing panel is arranged in such a manner with respect to the light-emitting panel, the important additional advantage is obtained that the length of the light-mixing panel is sufficient to satisfactorily mix the light originating from the light source comprising, for example, one or more LEDs, for example, of different colors.

By virtue of the measure in accordance with the invention, the distribution uniformity of the light emitted by the illumination system is improved. As a result, a more uniform illumination of the (image) display device is achieved.

By virtue of the fact that the light-mixing panel and the light-emitting panel are arranged so as to extend substantially parallel to each other, comparatively compact designs for the light transport chamber become possible. To achieve this, an embodiment of the illumination system is characterized in that the light transport chamber comprises an elliptically shaped, reflective inner wall. Such a light transport chamber efficiently transports the light originating from the light-mixing panel to the light-emitting panel. The advantage of a light transport chamber having an elliptically shaped inner wall resides in that a "flat" ellipse takes up a comparatively small amount of space.

By suitably positioning the elliptically shaped inner wall of the light transport chamber with respect to the light-mixing panel and the light-emitting panel, light is efficiently transported from the light-mixing panel to the light-emitting panel. To achieve this, a preferred embodiment of the illumination system is embodied such that the first focus of the ellipse is situated in or at least near the light output edge area of the light-mixing panel, and the second focus of the ellipse is situated in or at least near the light transmitting edge area of the light-emitting panel.

A suitable choice of the shape of the reflective elliptical inner wall of the light transport chamber enables the light to be efficiently transported from the light-mixing panel to the light-emitting panel. To achieve this, a further preferred embodiment of the illumination system is characterized in that the ratio of the length of the short axis of the ellipse to the length of the long axis of the ellipse lies in the range from $$0.4 \leq \frac{a}{b} \leq 1,$$

where a represents half the length of the short axis of the ellipse and b represents half the length of the long axis of the ellipse.

The smaller the ratio a/b is chosen, the more compact the light transport chamber can be embodied. At a ratio of a/b<0.4, the light transport efficiency decreases. At said ratio of a/b<0.4, there is also an increased risk that light rays return to the light-mixing panel. At a ratio of a/b>1, the physical size of the light transport chamber becomes unattractive.

More favorably, the ratio of a/b is chosen to be not too small and, at the same time, care should be taken that the dimensions of the light transport chamber do not become excessively large. Preferably, the ratio of half the length of the short axis of the ellipse to half the length of the long axis of the ellipse lies in the range from $$0.8 \leq \frac{a}{b} \leq 1.$$

In a particular embodiment of the light transport chamber having an elliptically shaped, reflective inner wall, the inner wall of the light transport chamber is at least substantially circular in shape, the center of the circle being situated between the light output edge area of the light-mixing panel and the light transmitting edge area of the light-emitting panel. A circle is a particular embodiment of an ellipse, where a=b. Such a shape of the light transport chamber is favorable, in particular, if the distance between the light-mixing panel and the light-emitting panel is very small. This can be achieved, for example, by arranging the light-mixing panel and the light-emitting panel in such a manner that they include a small angle, so that, at the location of the light output edge area of the light-mixing panel and the light input edge area of the light-emitting panel, the light-mixing panel and the light-emitting panel (substantially) contact each other.

Apart from a light transport chamber having an elliptically shaped, reflective inner wall, alternative embodiments of the light transport chamber are possible. An alternative embodiment of the illumination system is characterized in that the light transport chamber comprises two light-transmitting prisms. It is known that light that is incident at a certain angle is efficiently emitted again by prisms at an angle of 90°. In a light-mixing panel which is arranged so as to extend substantially parallel to the light-emitting panel, two successive prisms, between which there may be an air gap, cause light coupled out of the light-mixing panel to be efficiently coupled into the light-emitting panel again. A light transport chamber having two prisms has the advantage that such a construction takes up comparatively little space.

A further alternative embodiment of the illumination system is characterized in that the light transport chamber comprises a faceted, reflective inner wall. Multi-faceted inner walls optically resemble elliptically shaped inner walls. They occupy comparatively little space and can be readily manufactured as only a comparatively small part of the wall has to be bent. It is known that highly reflective mirrors sometimes exhibit a reduced specular reflection component after bending. This effect is reduced by faceting.

If the wall thickness of the light-mixing panel deviates from the size of the light-emitting surface of the light source, it is desirable to improve the input of light originating from the light source into the light-mixing panel. To achieve this, an embodiment of the illumination system is characterized in that a light-collimating element for coupling light originating from the light source into the light-mixing panel is situated between the light source and the light-mixing panel.

In general, the light-mixing panel is rectangular, so that it resembles the light-emitting panel whose dimensions correspond to the dimensions of the (display) screen of the (image) display device. In an alternative embodiment of the illumination system, the light-mixing panel narrows in a direction facing away from the light output edge area. In an alternative embodiment of the illumination system two or more of such light-mixing panels are arranged next to each other. This has the advantage that light-mixing panels of such comparatively small dimensions take up less space, and that less material is needed, leading to a reduction in weight of the display device.

In a further alternative embodiment of the illumination system, the light-mixing panel narrows in the direction of the light output edge area, so that the LEDs inject the light through the widest edge area extending transversely to the light output edge area. Alternatively, two such mirrorwise mixing panels are possible, which are juxtaposed, thereby enabling light to be coupled in through two edge areas.

In a further alternative embodiment of the illumination system, the light input edge area of the light-mixing panel is provided with a structure such that the light propagates in the light-mixing panel at larger angles, resulting in improved color mixing and/or flux homogenization, and the light output edge area of the light-mixing panel is provided with a structure such that the light incident on this edge area is not subject to total internal reflection, or the structure is such that reflecting edge areas do not cause said total internal reflection.

In a further alternative embodiment of the illumination system, the light output edge area of the light-mixing panel and the light input edge area of the light-emitting panel are oriented at an angle with respect to each other. Such an embodiment has the advantage that the efficiency of the light transport chamber is increased.

In a preferred embodiment of the illumination system, the light-mixing panel comprises a first and a second part, having a respective first and second light input edge area and a first and second light output edge area, wherein a first and second light-transport chamber for transporting light from the respective first and second light-mixing panel part to the light-emitting panel being situated between the respective first and second light-mixing panel part and the light-emitting panel. Such an embodiment has as advantage that flux homogeneity is further improved.

In a first version of the preferred embodiment the light source is common to the first and second light-mixing panel part. This is in particular of advantage for a light source, for instance formed by a multitude of LEDs, having a radiation pattern into relative high solid angles.

In a second version of the preferred embodiment the light source comprises a first and a second section coupled to the respective first and second light input edge area. In this way further brightness increase is achievable in an advantageous way.

A preferred embodiment of the illumination system is characterized in that the light source comprises at least three light-emitting diodes with a first, a second and a third light emission wavelength, which light emission wavelengths are different. Preferably, the light source associated with the light input edge area of the light-mixing panel comprises clusters of blue, green and red light-emitting diodes.

The principle of light mixing in a light-mixing panel can also be used to homogenize the flux distribution when use is made of, for example, white (high-flux) LEDs or two types of LEDs one of which emits in two light emission wavebands (for example blue and green) and the other emits in another light emission wavelength (for example red). Consequently, the light-mixing panel serves two purposes: the homogenization of the light distribution originating from the discrete (LED) light source(s) and the mixing of the colors when sources of different colors are used. LEDs having two light emission wavelengths can be obtained by providing a LED with a phosphor, as a result of which the light emission of the light emitted by the LED is converted by the phosphor to light of a different, desired light emission wavelength. For this purpose, use can particularly suitably be made of a combination of red LEDs and phosphor LEDs to generate the other colors.

The application of LEDs has the additional advantage that dynamic illumination possibilities are obtained. For this purpose, a sensor for measuring the optical properties of the light which, in operation is emitted by the light source is preferably situated at an edge area of the light-mixing panel or, preferably, at an edge area of the light-emitting panel. If different types of LEDs are combined and/or LEDs of different colors are used, colors can be mixed in the desired manner, for example, to cause the illumination system to emit white light having a desired color temperature. In addition, color changes can be brought about independent of the state of the display device.

The amount of light emitted by the LEDs is regulated by varying the luminous flux of the light-emitting diodes. Regulating the luminous flux generally takes place in an energy-efficient manner. For example, LEDs can be dimmed without an appreciable decrease in efficiency. Preferably, the intensity of the light emitted by the light-emitting diodes is variable in response to the illumination level of an image to be displayed by the display device, or in response to the level of the ambient light. Preferably, the color point of an image displayed by the display device is determined by the illumination system. By virtue thereof, a(n) (improved) dynamic range (for example contrast) of the image to be displayed by the display device is obtained.

By virtue of the measure in accordance with the invention, the light emitted by the illumination system is more uniformly distributed. As a result, a more uniform illumination of the (image) display device is obtained. In addition, an illumination system in accordance with the invention enables a (laterally) more compact illumination system having the same light uniformity to be obtained.

Preferably, the illumination system comprises control electronics for changing the luminous flux of the light-emitting diodes. Suitable control electronics enables the desired color temperature effects to be achieved. It is particularly suitable if the control electronics can be influenced by the user of the assembly, by a sensor that measures, for example, the color temperature of the ambient light, by a video card of, for example, a (personal) computer and/or by drive software of a computer program.

The front wall or, preferably, the rear wall of the light-emitting panel is generally provided with means for coupling light out of the panel. These means for coupling out light are also referred to as output members. These means, which are known per se, comprise (patterns of) deformations. The means couple light out of the light-emitting panels by reflection, scattering and/or refraction. The means for coupling out light generally are not uniformly distributed over the rear wall of the relevant light-emitting panel; instead they are provided with a predetermined gradient enabling light to be coupled out of the relevant light-emitting panel as uniformly as possible.

These and other aspects of the invention will be apparent from and elucidated with reference to the embodiment(s) described hereinafter.

In the drawings.

The Figures are purely diagrammatic and not drawn to scale. Particularly for clarity, some dimensions are exaggerated strongly. Where possible, in the Figures, like reference numerals refer to like parts.

Figure 1:
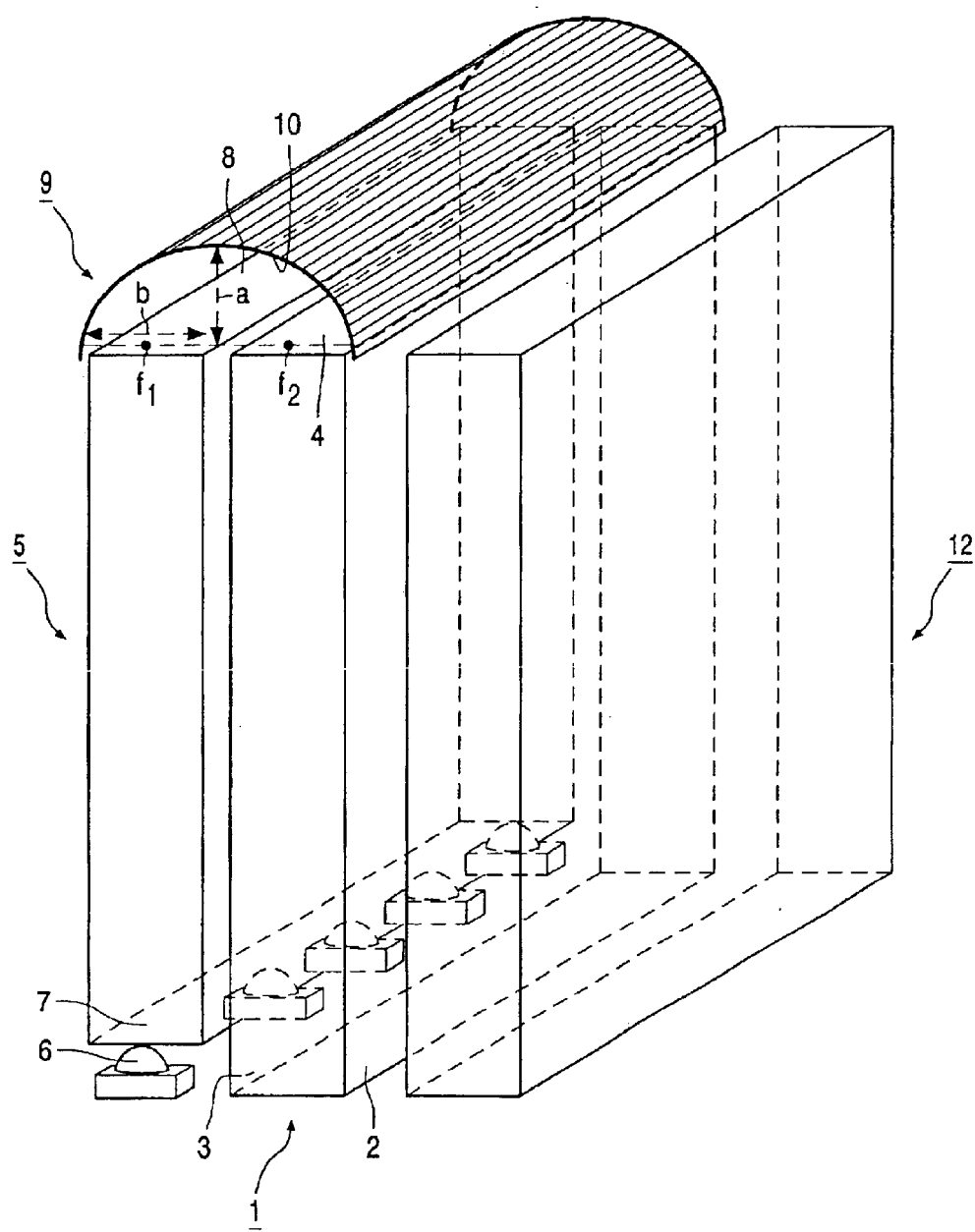
FIG. 1 is a side view of a display device comprising an embodiment of the illumination system in accordance with the invention.

FIG. 1 is a diagrammatic side view of a display device comprising an embodiment of the illumination system in accordance with the invention. The illumination system comprises a light-emitting panel 1 of a light-transmitting material. The panel 1 is made from, for example, a synthetic resin, acryl, polycarbonate, PPMA, such as perspex, or of glass. In operation, light is transported through the panel 1 under the influence of total internal reflection. The panel 1 has a front wall 2 and a rear wall 3 opposite said front wall. Between the front wall 2 and the rear wall 3 of the light-emitting panel 1, there is at least one light transmitting edge area 4. The illumination system comprises a light source 6, for example a number of light-emitting diodes (LEDs). The illumination system additionally comprises a light-mixing panel 5 for mixing light originating from the light source 6. The light-mixing panel 5 is provided with a light input edge area 7 for coupling light originating from the light source 6 into the light-mixing panel 5. The light-mixing panel 5 is provided with a light output edge area 8 for coupling light out of the light-mixing panel 5. In the situation shown in FIG. 1, in operation, light originating from the light source 6 is incident on the light input edge area 7 of the light-mixing panel 5, which light spreads in the light-mixing panel 5. In the illumination system, a light transport chamber 9 for transporting light from the light-mixing panel 5 to the light-emitting panel 1 is situated between the light-mixing panel 5 and the light-emitting panel 1. The light-mixing panel 5 and the light-emitting panel 1 are arranged substantially parallel to each other. In the example shown in FIG. 1, the light transport chamber 5 comprises an elliptically shaped, reflective inner wall 10.

The light-emitting panel 1 emits, in operation, light in the direction of the display device, for example a liquid crystal display (LCD) device 12. For this purpose, the rear wall 3 of the light-emitting panel 1 is provided with means (not shown in FIG. 1; see FIG. 2A) for coupling light out of the light-emitting panel 1.

The assembly of light-emitting panel 1, light source 6, light-mixing panel 5, light transport chamber 9 and LCD device 12, whether or not accommodated in a housing (not shown in FIG. 1), forms a display device for displaying, for example, (video) images.

In an alternative embodiment of the illumination system, the geometric shape of the light-emitting panel and/or light-mixing panel is not limited by right angles. If the light-emitting panel and/or the light-mixing panel is/are conceived as an assembly of a rectangular block and a prism, then the light input edge area of the light-emitting panel and/or the light output edge area of the light-mixing panel form(s) the sloping face of the prism. The advantage of such a construction is that the efficiency with which the flux is coupled by the light transport chamber is enhanced.

The light source 6 comprises a plurality of light-emitting diodes (LEDs). In general, the source brightness of LEDs is many times that of fluorescent tubes. In addition, when use is made of LEDs, the efficiency with which light is coupled into the panel is higher than in the case of fluorescent tubes. The use of LEDs as a light source has the advantage that the LEDs may contact panels made of a synthetic resin material. LEDs hardly emit heat in the direction of the light-emitting panel 1 and do not emit detrimental (UV) radiation. The use of LEDs has the additional advantage that means for coupling light originating from the LEDs into the panel can be dispensed with. The application of LEDs preferably leads to a more compact illumination system. In the illumination system, the LEDs may comprise suitably chosen clusters of red, green and blue LEDs or suitable other combinations of one or two-color LEDs or a plurality of white LEDs with a high flux.

The LEDs employed in the different embodiments of the illumination system preferably each have an optical luminous flux of at least 50 mW. LEDs having such a high output are alternatively referred to as LED power packages. Examples of power LEDs are "Luxeon™"-type LEDs (Lumileds), where the luminous flux per LED is 35 lm for red LEDs, 20 lm for green LEDs, 8 lm for blue LEDs and 40 lm for amber LEDs.

In alternative embodiments use can also be made of yellow, amber, cyan, magenta and/or purple LEDs, which have a comparatively high light output (whether use is made of two spectral light emission wavelengths or not). It is also possible to employ a plurality of white LEDs having a high flux. In further alternative embodiments use can also be made of red LEDs in combination with blue LEDs, which are provided with a phosphor causing the latter to emit in two spectral bands, i.e. a blue band and a green band.

Preferably, the LEDs are mounted on a (metal-core) printed circuit board. If power LEDs are mounted on such a (metal-core) printed circuit board (PCB), the heat generated by the LEDs can be readily dissipated by heat conduction via the PCB. In an interesting embodiment of the illumination system, the (metal-core) printed circuit board is in contact with the housing of the display device via a heat-conducting connection.

The light-emitting panel 1 may be additionally provided with a sensor (not shown in FIG. 1) for measuring the optical properties of the light. This sensor is coupled to control electronics (not shown in FIG. 1) for suitably adapting the luminous flux of the light source 6. By means of the sensor and the control electronics, a feedback mechanism can be obtained that can be used to influence the quality and the quantity of the light coupled out of the light-emitting panel 1.

The light transport chamber 5 shown in FIG. 1 comprises an elliptically shaped, reflective inner wall 10. Preferably, the first focus $f_1$ of the ellipse is situated in, or at least near, the light output edge area 8 of the light-mixing panel 5, and the second focus $f_2$ of the ellipse is situated in, or at least near, the light transmitting edge area 4 of the light-emitting panel 1. By means of the elliptic mirror the light originating from the light-mixing panel 5 is efficiently transported to the light-emitting panel 1. It is particularly favorable if the foci are situated at a small distance (for example 0.2 mm) from the respective edge areas in the light transport chamber (see the situation shown in FIG. 1). In this manner, light losses caused by light being undesirably coupled out at the edges of the edge area of (particularly) the light-mixing panel 5 are reduced substantially. In general, an ellipse has a so-termed short axis with a half length a and a so-termed long axis with a half length b, which are both shown in FIG. 1, which ellipse meets the mathematical relation:

$$\frac{x^2}{a^2} + \frac{y^2}{b^2} = 1,$$

where x and y are the known Cartesian co-ordinates. The ratio a/b of the ellipse lies in the range from $$0.4 \le \frac{a}{b} \le 1.$$

The smaller the ratio a/b is chosen, the more compact the light transport chamber 5 can be embodied. At a ratio a/b<0.4, the efficiency of the light transmission decreases and the risk that light rays return to the light-mixing panel 5 increases. At a ratio a/b>1, the physical size of the light transport chamber 9 becomes unattractive. By way of example, at a ratio a/b=0.5, the additional loss of light in the light transport chamber 9 is approximately 10% (see also FIG. 6). This is based on the assumption that a gap of approximately 0.5 mm is situated between the light-mixing panel 5 and the light-emitting panel 1 at the location of the respective edge areas 8; 4, while the thickness of the light-mixing panel 5 and of the light-emitting panel 1 is approximately 6 mm at the location of the respective edge areas 8; 4.

At a ratio of a/b=1, the inner wall of the light transport chamber 5 is at least substantially circular, and the light transport chamber 5 is in the form of half a hollow cylinder. In this case, the center of the circle is situated between the light output edge area 8 of the light-mixing panel 5 and the light transmitting edge area 4 of the light-emitting panel 1. Such a shape of the light transport chamber 9 is favorable, in particular, if the distance between the light-mixing panel 5 and the light-emitting panel 1 is very small. This can be achieved, for example, by arranging the light-mixing panel 5 and the light-emitting panel 1 so as to include a small angle, so that the light-mixing panel 5 and the light-emitting panel 1 are (at least substantially) in contact with each other at the location of the light output edge area 8 of the light-mixing panel 5 and the light input edge area 4 of the light-emitting panel 1.

More favorably, the ratio a/b is chosen to be not too small, while, at the same time, care should be taken that the dimensions of the light transport chamber 9 do not become too large. Preferably, the ratio a/b lies in the range from $$0.8 \leq \frac{a}{b} \leq 1.$$

A ratio a/b≈0.85 is particularly favorable. This is based on the assumption that a gap of approximately 0.5 mm is situated between the light-mixing panel 5 and the light-emitting panel 1 at the location of the respective edge areas 8; 4, while the thickness of the light-mixing panel 5 and the light-emitting panel 1 is approximately 6 mm at the location of the respective edge areas 8; 4.

Figure 2A:
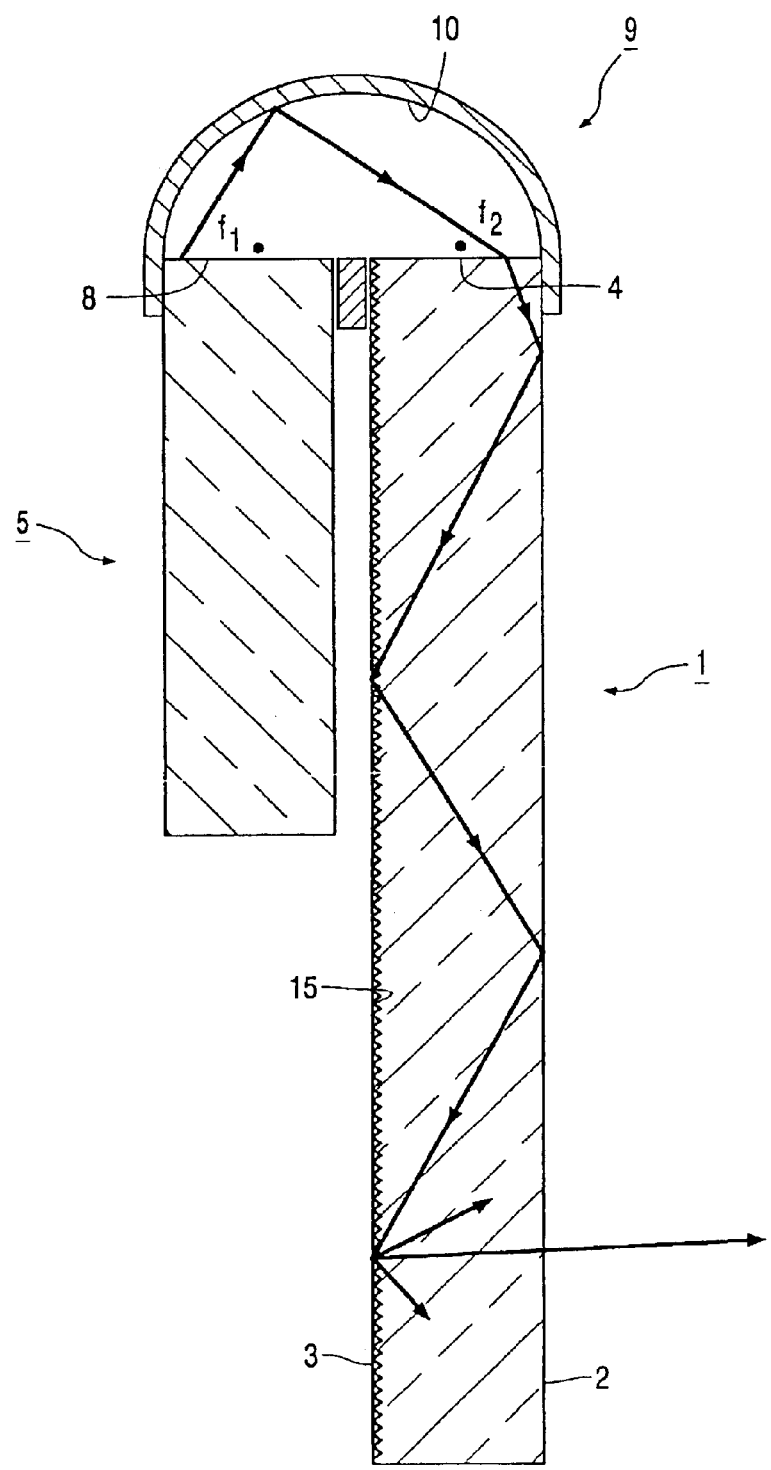
FIG. 2A is a cross-sectional view of an alternative embodiment of the illumination system in accordance with the invention.

FIG. 2A is a diagrammatic, cross-sectional view of an alternative embodiment of the illumination system in accordance with the invention. The illumination system comprises a light-emitting panel 1, a light-mixing panel 5 and a light transport chamber 9 for transferring light from the light-mixing panel 5 to the light-emitting panel 1. The light-mixing panel 5 and the light-emitting panel 1 are arranged so as to be substantially parallel to each other. The light source is not shown in FIG. 2A because, in FIGS. 2B through 2E, various embodiments of the light-mixing panel 5 are shown wherein the LEDs are provided at different locations.

In operation, the light-emitting panel 1 emits light in the direction of the display device, for example a liquid crystal display (LCD) device (not shown in FIG. 2A). For this purpose, the rear wall 3 of the light-emitting panel 1 is provided with means 15 for coupling light out of the light-emitting panel 1. These means 15 comprise (patterns of) deformations as well as, for example, screen printed dots, wedges and/or ridges. The means 15 are provided in the rear wall of the panel 1 by means of, for example, printing, pressing, etching, scribing or sandblasting. In an alternative embodiment, the deformations are provided in the front wall of the light-emitting panel. The means 15 couple light out of the light-emitting panel 1 by reflection, scattering and/or refraction. In general, the means 15 for coupling out light are not uniformly distributed over the rear wall of the relevant light-emitting panel; instead they are provided with a predetermined gradient enabling light to be coupled out of the relevant illumination system as uniformly as possible.

The means 15 for coupling out light serve as a secondary light source. A specific optical system may be associated with this second light source, which optical system is provided, for example, on the front wall 2 (not shown in FIG. 2A). The optical system may be used, for example, to generate a broad light beam.

In FIG. 2A, a light ray coupling light out of the light-mixing panel 5 via the light output edge area 8 is diagrammatically shown by means of arrows, which light is subsequently reflected by the elliptical (with foci $f_1$ and $f_2$) reflecting inner wall 10 of the light transport chamber 9, after which said light is coupled into the light input edge area 4 of the light-emitting panel 1 and is, subsequently, coupled out of the front wall 2 of the light-emitting panel 1 via the means 15.

FIGS. 2B–2E are side views of various embodiments of the light-mixing panel shown in FIG. 2A. The orientation of the light-mixing panels in the FIGS. 2B–2E is transverse to the plane of the drawing of FIG. 2A.

Figure 2B:
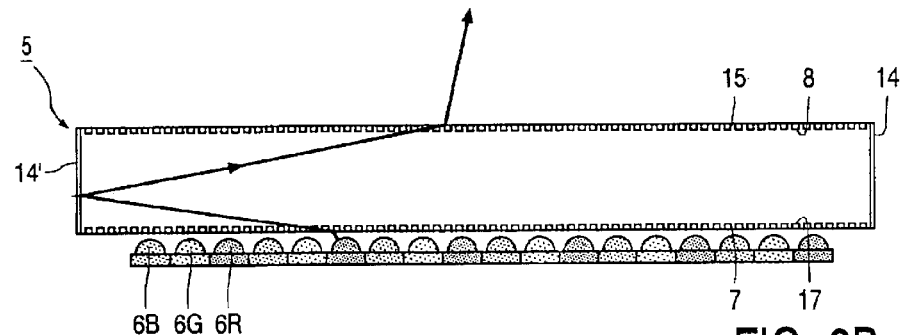
FIGS. 2B–2E are side views of various embodiments of the light-mixing panel of FIG. 2A.

FIG. 2B is a side view of an embodiment of the light-mixing panel of FIG. 2A. In this example, the light source comprises a linear array of blue (6B), green (6G) and red (6R) LEDs which couple light into the light input edge area 7 of the light-mixing panel 5. The light input edge area 7 is provided, in this example, with a so-termed beam broadening structure 17 for broadening the light beams coupled in. The light-mixing panel 5 is further provided with a light output edge area 8 for coupling light out of the light-mixing panel 5. The light output edge area is provided, in this example, with means 18 for enhancing the output of light from the light-mixing panel 5 to the light transport chamber (not shown in FIG. 2B). In the example of FIG. 2B, side faces of the light-mixing panel 5 are provided with (specularly) reflective side faces 14, 14'. In the situation shown in FIG. 2B, in operation, light originating from the LEDs 6B, 6G, 6R is incident on the light input edge area 7 provided with the beam broadening structure 17, which light subsequently spreads and is mixed in the light-mixing panel 5, after which said light is coupled out of the light-mixing panel 5 via the light output edge area 8 provided with the means 15. In FIG. 2B, arrows diagrammatically indicate a light ray originating from a LED 6B, 6G, 6R, which travels through the light-mixing panel 5 and is subsequently coupled out of the light-mixing panel 5.

Figure 2C:
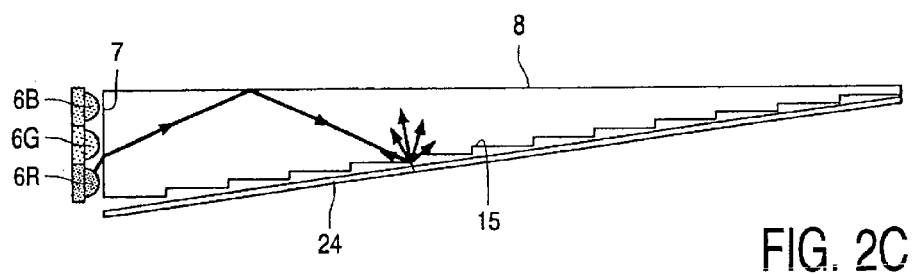

FIG. 2C is a side view of an alternative embodiment of the light-mixing panel of FIG. 2A. In this example, the light input edge area 7 and the light output edge area 8 are arranged so as to include an angle (a right angle in the example shown in FIG. 2C). Furthermore, the light-mixing panel 5 narrows in a direction facing away from the light input edge area 7. A side face of the light-mixing panel 5 situated opposite the light output edge area 8 is provided, in this example, with means 15 for coupling light out of the light-mixing panel 5, and said side face is further provided with a diffusely reflecting mirror 24. The light source comprises a linear array of blue (6B), green (6G) and red (6R) LEDs, which couple light into the light input edge area 7 of the light-mixing panel 5. In the situation shown in FIG. 2C, in operation, light originating from the LEDs 6B, 6G, 6R is incident on the light input edge area 7, which light subsequently spreads and is mixed in the light-mixing panel 5, after which said light is coupled out of the light-mixing panel 5, by means of the means 15, via the light output edge area 8. In FIG. 2C, arrows diagrammatically indicate a light ray originating from a LED 6B, 6G, 6R, which light ray travels through the light-mixing panel 5 and is subsequently coupled out of the light-mixing panel 5.

Figure 2D:
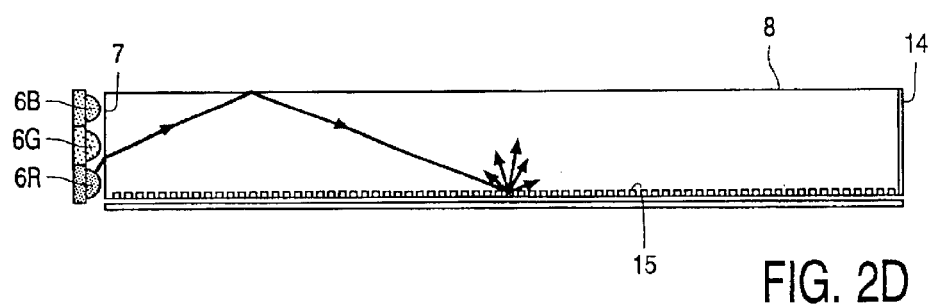

FIG. 2D is a side view of a further alternative embodiment of the light-mixing panel shown in FIG. 2A. In this example, the light input edge area 7 and the light output edge area 8 are arranged so as to include an angle (in the example shown in FIG. 2D the angle is a right angle). A side face of the light-mixing panel 5 situated opposite the light output edge area 8 is provided, in this example, with means 15 for coupling light out of the light-mixing panel 5. A side face of the light-mixing panel 5 situated opposite the light input edge area 7 is provided, in this example, with a (specularly) reflecting mirror 14. The light source comprises a linear array of blue (6B), green (6G) and red (6R) LEDs which couple light into the light input edge area 7 of the light-mixing panel 5. In the situation shown in FIG. 2D, in operation, light originating from the LEDs 6B, 6G, 6R is incident on the light input edge area 7, which light subsequently spreads and is mixed in the light-mixing panel 5, after which said light is coupled out of the light-mixing panel 5, by means of the means 15, via the light output edge area 8. In FIG. 2D, arrows diagrammatically indicate a light ray originating from a LED 6B, 6G, 6R, which light ray travels through the light-mixing panel S and is subsequently coupled out of the light-mixing panel 5.

Figure 2E:
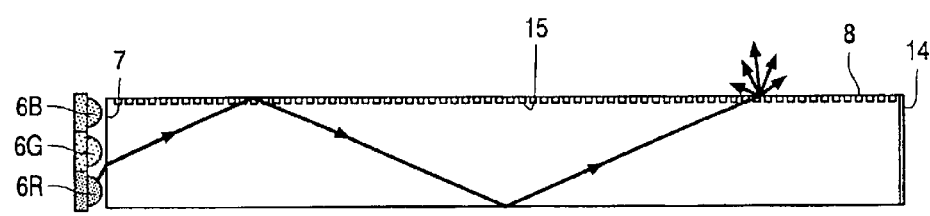

FIG. 2E is a side view of a further alternative embodiment of the light-mixing panel shown in FIG. 2A. In this example, the light input edge area 7 and the light output edge area 8 are arranged so as to include an angle (in the example of FIG. 2E, the angle is a right angle). The light output edge area 8 is provided, in this example, with means 15 for coupling light out of the light-mixing panel 5. A side face of the light-mixing panel 5 situated opposite the light input edge area 7 is provided, in this example, with a (specularly) reflecting mirror 14. The light source comprises a linear array of blue (6B), green (6G) and red (6R) LEDs which couple light into the light input edge area 7 of the light-mixing panel 5. In the situation shown in FIG. 2E, in operation, light originating from the LEDs 6B, 6G, 6R is incident on the light input edge area 7, which light subsequently spreads and is mixed in the light-mixing panel 5, after which said light is coupled out of the light-mixing panel 5, by means of the means 15, via the light output edge area 8. In FIG. 2E, arrows diagrammatically indicate a light ray originating from a LED 6B, 6G, 6R, which light ray travels through the light-mixing panel 5 and is subsequently coupled out of the light-mixing panel 5.

Figure 3A:
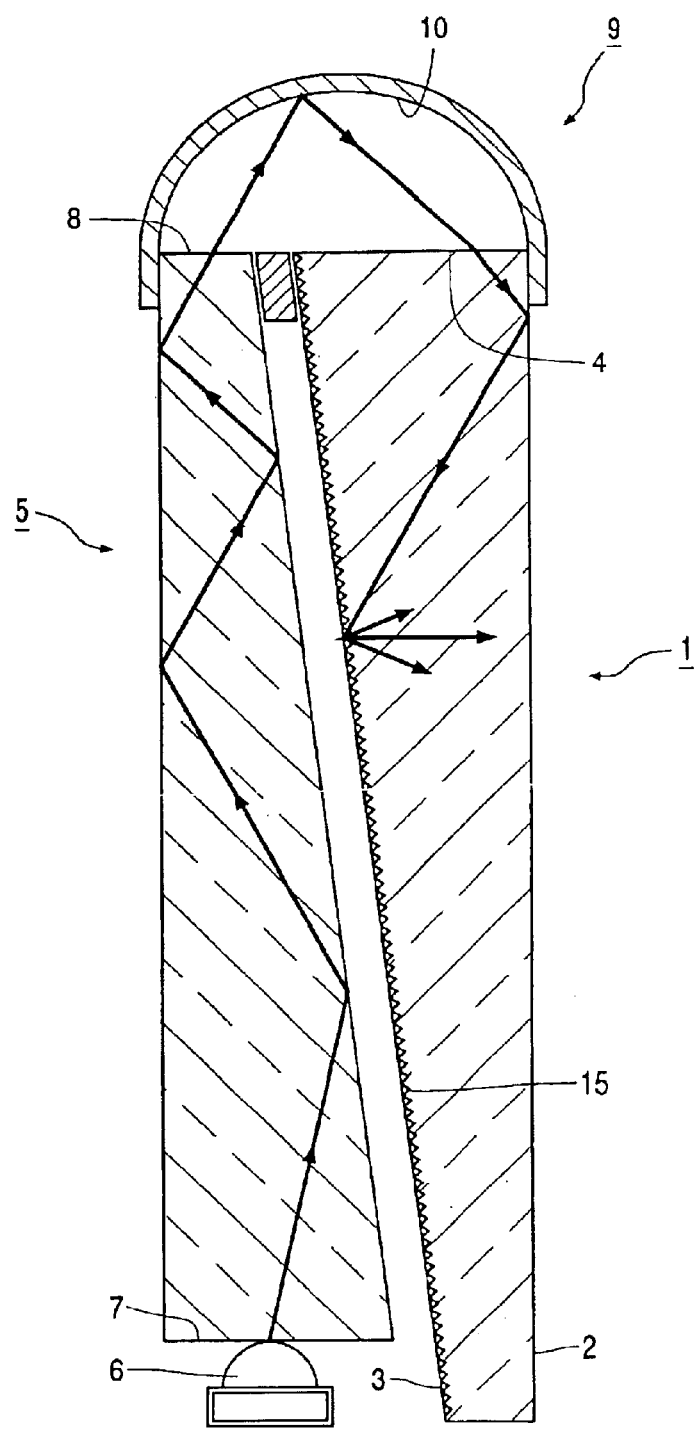
FIG. 3A is a cross-sectional view of an alternative embodiment of the illumination system in accordance with the invention.

FIG. 3A is a diagrammatic, cross-sectional view of an alternative embodiment of the illumination system in accordance with the invention. The illumination system comprises a light-emitting panel 1, a light-mixing panel 5 and a light transport chamber 9 for transferring light from the light-mixing panel 5 to the light-emitting panel 1. The light-mixing panel 5 and the light-emitting panel 1 are arranged so as to extend substantially parallel to each other. The example of the illumination system shown in FIG. 3A is particularly space-saving. To achieve this, the light-mixing panel 5 narrows from the light input edge area 7 in the direction of the light output edge area 8, and the light-emitting panel 1 narrows (in a complementary manner) in a direction away from the light input edge area 4.

In operation, the light-emitting panel 1 emits light in the direction of the display device, for example a liquid crystal display (LCD) device (not shown in FIG. 3A). For this purpose, the rear wall 3 of the light-emitting panel 1 is provided with means 15 for coupling light out of the light-emitting panel 1.

In FIG. 3A, arrows diagrammatically indicate a light ray which couples light originating from the light source 6 into the light-mixing panel 5 via the light input edge area 7, which light spreads through the light-mixing panel 5 and is subsequently coupled out of the light-mixing panel 5 via the light output edge area 8, after which said light is reflected by the elliptical, reflecting inner wall 10 of the light transport chamber 9 and subsequently coupled into the light input edge area 4 of the light-emitting panel 1, after which the light is coupled out of the front wall 2 of the light-emitting panel 1 via the means 15. In an alternative embodiment of the illumination system, as shown in FIG. 3A, a light transport chamber comprises an inner wall having an asymmetric, elliptical shape. By means of an asymmetric mirror, the difference between the dimensions of the light output edge area 8 of the light-emitting panel 5 and the light input edge area 4 of the light-emitting panel 1 is compensated.

Figure 3B:
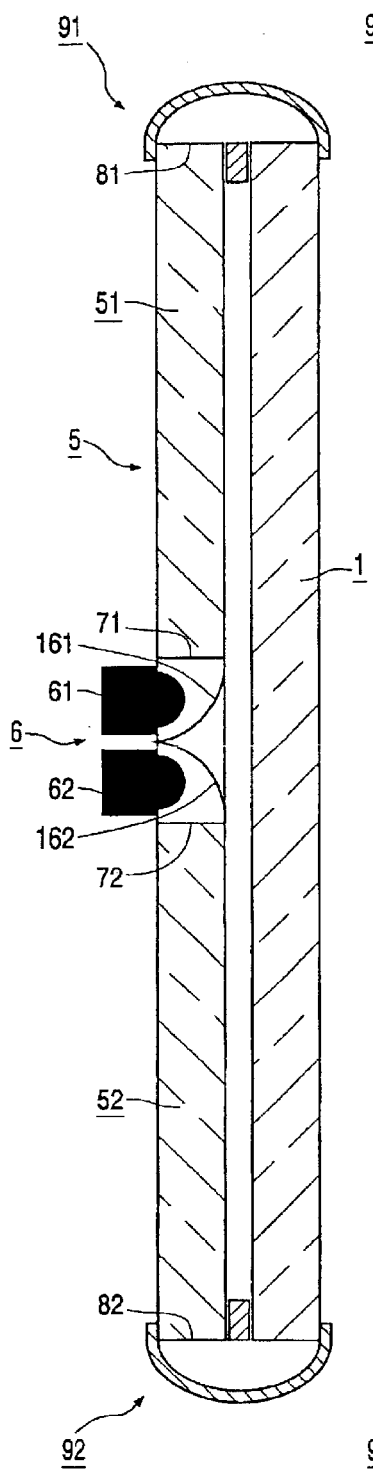
FIG. 3B–3D is a cross-sectional view of various other alternative embodiments of the illumination system in accordance with the invention.
Figure 3C:
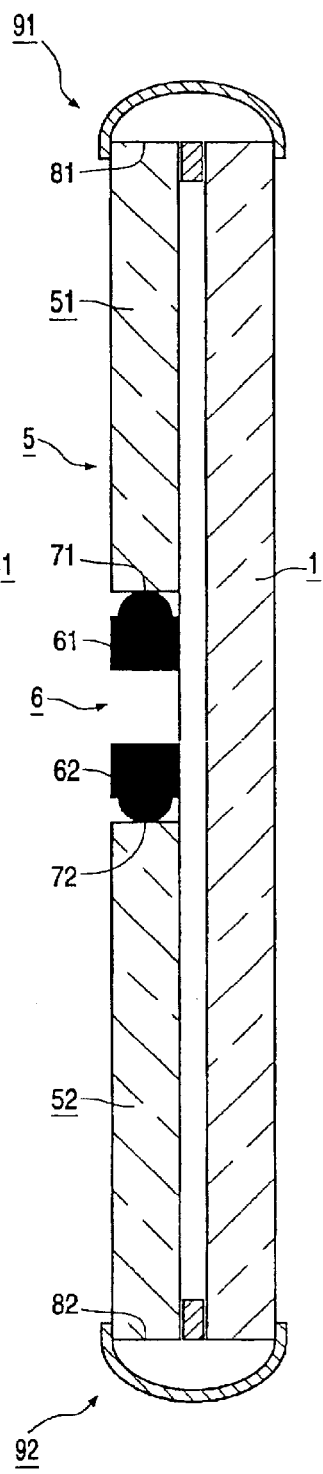
Figure 3D:
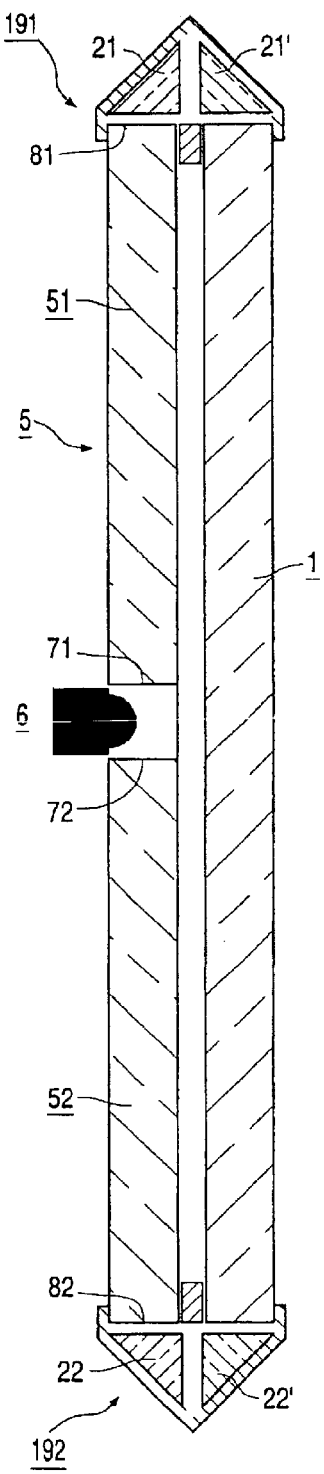

FIGS. 3B–3D are a diagrammatic, cross-sectional view of further alternative embodiments of the illumination system in accordance with the invention. The illumination system comprises a light-emitting panel 1, a light-mixing panel 5 comprising a first part 51 and a second part 52 and respective first 91, 191 and second 92, 192 light transport chambers for transferring light from the light-mixing panel 5 to the light-emitting panel 1. The light-mixing panel first part 51 and second part 52 have respective first and second light input edge areas 71, 72, and respective first and second light output edge areas 81, 82. In the embodiments shown in FIGS. 3B and 3C the light source 6 comprises a first and second section 61, 62 coupled to the respective first and second light input edge area 71, 72. The light source is for instance formed by LEDs. In this way it is advantageously possible to realise an increased brightness of the illumination system by installing twice as much LEDs in comparison with the illumination system embodiment according to FIG. 3A. In the embodiment according to FIG. 3B the light radiated from the LEDs forming the light source sections 61, 62 is coupled into the respective light-mixing panel parts with aid of a light collimating element 161, 162. This embodiment has the advantage that a relative simple light source mounting is combined with an efficient coupling of the light into the light-mixing panel parts. With respect to a restricted available depth of the illumination system the light source section configuration according to the embodiment shown in FIG. 6C can be of advantage. In a further alternative shown in FIG. 3D the light source is common to the first and second light-mixing panel part. Such configuration is in particular of interest for a light source with a radiation pattern having a relative high solid angle. In this further embodiment each of the first and second light transport chamber 191, 192 comprises two light-transmitting prisms 21, 21', 22, 22', which type of light transport chamber is elucidated in greater detail in FIG. 5A and corresponding description.

Figure 4A:
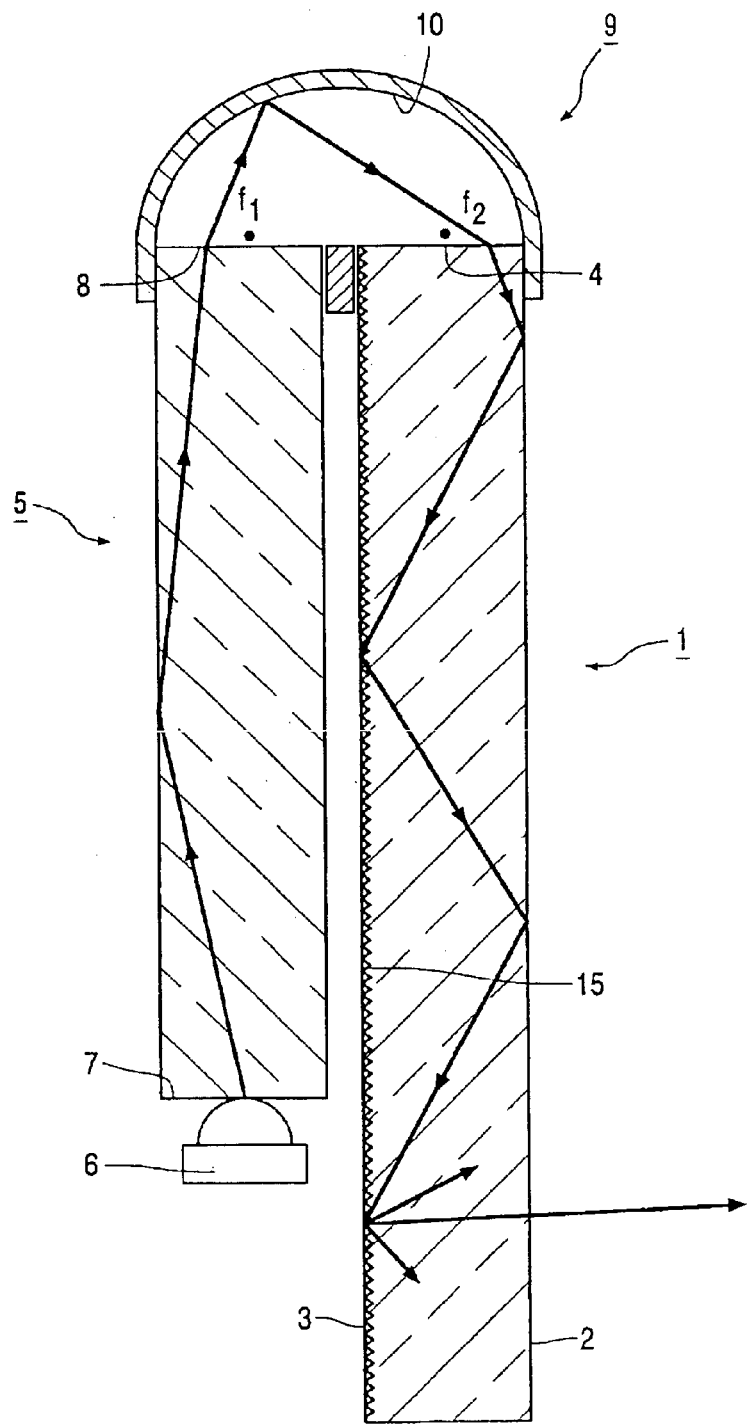
FIG. 4A is a cross-sectional view of a further alternative embodiment of the illumination system in accordance with the invention.

FIG. 4A is a cross-sectional view of a further alternative embodiment of the illumination system in accordance with the invention. Said illumination system comprises a light-emitting panel 1, a light-mixing panel 5 and a light transport chamber 9 for transferring light from the light-mixing panel 5 to the light-emitting panel 1. The light-mixing panel 5 and the light-emitting panel 1 are arranged so as to extend substantially parallel to each other.

In FIG. 4A, arrows diagrammatically indicate a light ray which couples light originating from the light source 6 into the light-mixing panel 5 via the light input edge area 7, which light spreads through the light-mixing panel 5 and is subsequently coupled out of the light-mixing panel 5 via the light output edge area 8, after which said light is reflected by the elliptical, reflecting inner wall 10 of the light transport chamber 9 and subsequently coupled into the light-emitting panel 1 via the light input edge area 4, which light is subsequently coupled out of the front wall 2 of the light-emitting panel 1 via the means 15.

Figure 4B:
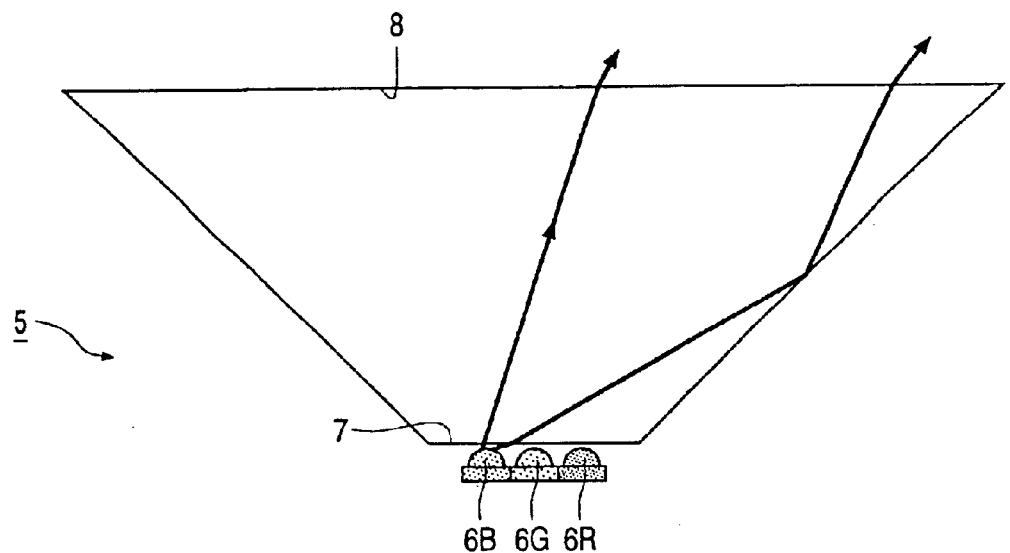
FIGS. 4B–4C are side views of various embodiments of the light-mixing panel of FIG. 4A.
Figure 4C:
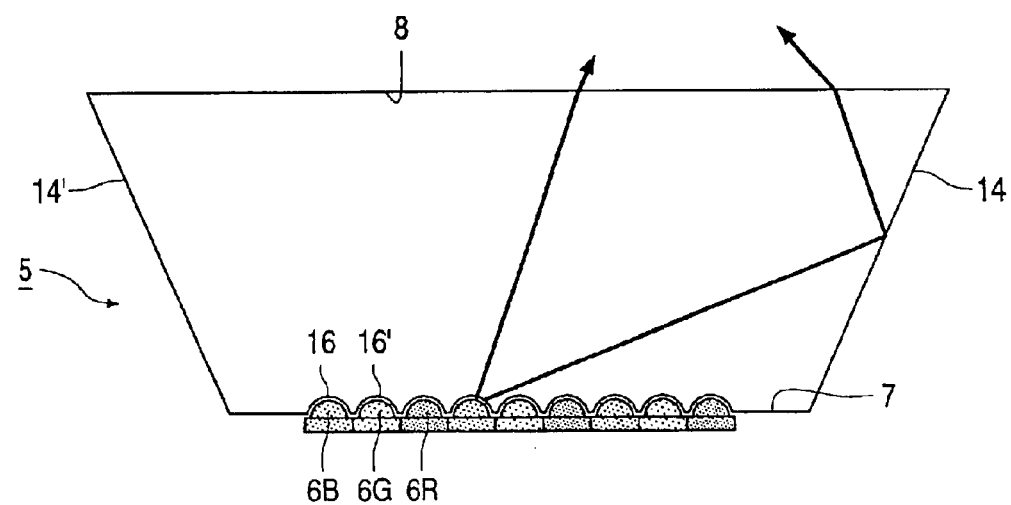

FIGS. 4B and 4C show various space-saving and material-saving embodiments of the light-mixing panel shown in FIG. 4A. These Figures show embodiments of the light-mixing panel, wherein the light-mixing panel 5 widens from the light input edge area 7 in the direction of the light output edge area 8. In FIG. 4B, the LEDs 6B, 6G, 6R contact the light input edge area 7, while, in FIG. 4C, the light-mixing panel 5 is provided with recesses 16, 16', . . . so as to obtain a more divergent light beam and hence improve the mixing of the colors or the flux homogeneity in the light-mixing panel 5. The recesses 16, 16', . . . are shaped such that the part of the LED from which the light issues fits in said recess. In FIG. 4C, side faces of the light-mixing panel 5 are further provided with (specularly) reflecting side faces 14, 14'.

Figure 5A:
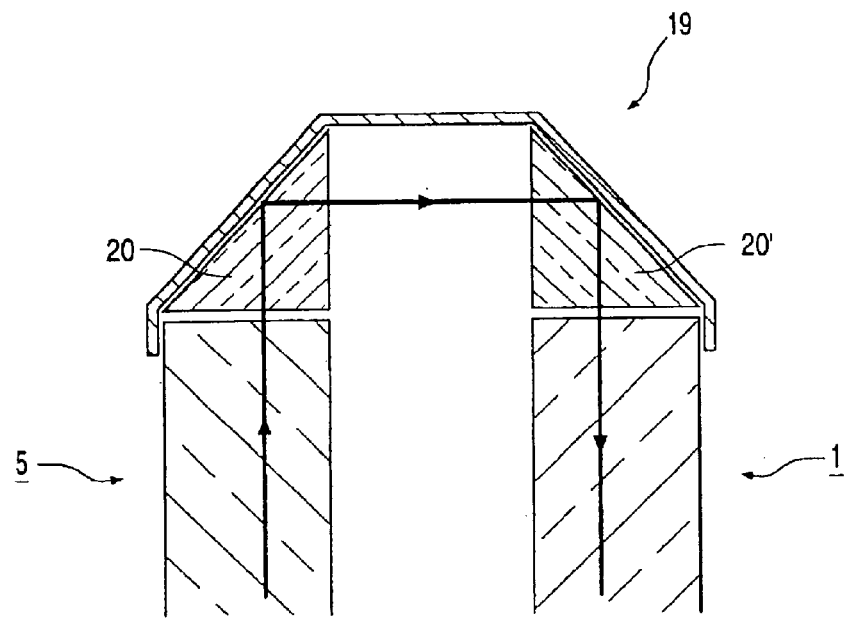
FIG. 5A is a cross-sectional view of a detail of a further alternative embodiment of the illumination system in accordance with the invention.

FIG. 5A is a very diagrammatic, cross-sectional view of a detail of a further alternative embodiment of the illumination system in accordance with the invention, wherein the light transport chamber 19 comprises two light-transmitting prisms 20, 20'. The light-emitting panel 5 and the light-emitting panel 1 are only partly shown. Preferably, the light transport chamber comprises specularly reflecting inner walls. Arrows diagrammatically indicate a light beam. If the air gap between the prisms is sufficiently small, each light beam leaving the light-mixing panel will be coupled into the light-emitting panel 1. In alternative embodiments, an air chamber or an optical waveguide is situated between the two prisms.

Figure 5B:
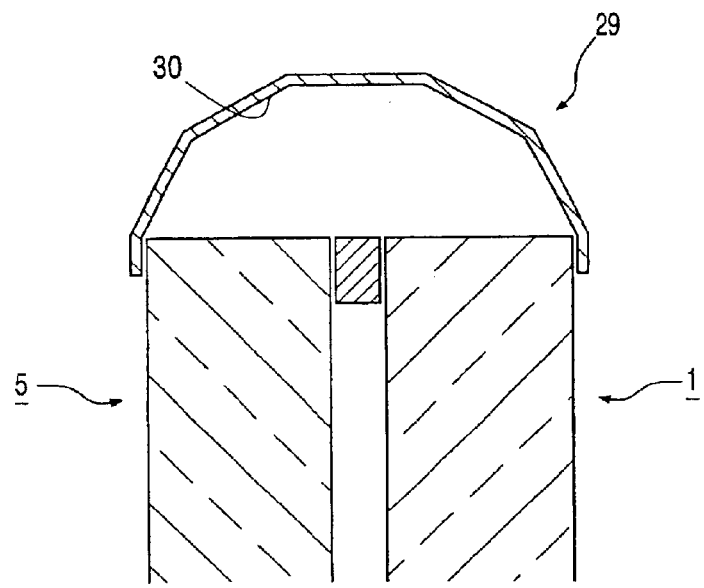
FIG. 5B is a cross-sectional view of a detail of a further alternative embodiment of the illumination system in accordance with the invention.

FIG. 5B is a very diagrammatic, cross-sectional view of a detail of a further alternative embodiment of the illumination system in accordance with the invention, wherein the light transport chamber 29 comprises a multi-faceted, reflecting inner wall 30. Preferably, the light transport chamber 29 comprises five or more, preferably eight, reflecting facets. In comparison with said elliptical inner wall, an inner wall with 5 reflecting facets results in a 5% reduction of the coupling efficiency of the luminous flux, and an inner wall with 8 facets results in a 2% reduction of the coupling efficiency of the luminous flux. The light-mixing panel 5 and the light-emitting panel 1 are only partly shown.

Figure 6:
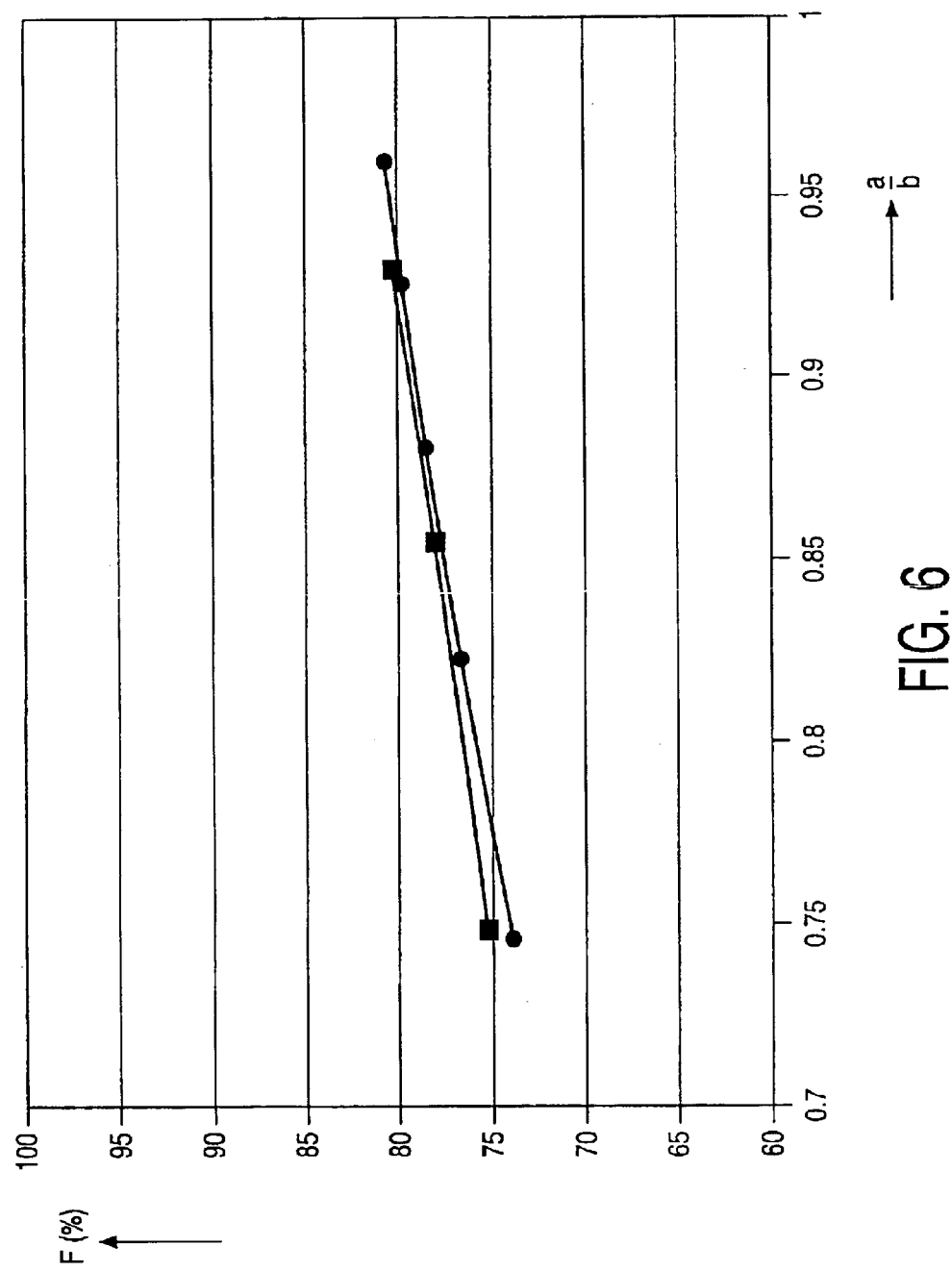
FIG. 6 shows a graph wherein the coupling efficiency of the luminous flux of the 180° ellipse is plotted as a function of the ratio between the length of the short axis of the ellipse and the long axis of the ellipse.

FIG. 6 shows a graph wherein the coupling efficiency F of the luminous flux of the 180° reflecting ellipse is plotted as a function of the ratio between the length of the short axis and the length of the long axis of the ellipse. The efficiency F is the ratio (in %) of the flux in the light-emitting panel 1 to the flux in the light-mixing panel 5. The efficiency of the reflection by the reflecting inner wall of the ellipse is 0.95. The circles shown in FIG. 6 correspond to the results of an experiment where the distance between the light-mixing panel 5 and the light-emitting panel 1 is 0.5 mm. The squares shown in FIG. 6 correspond to results of an experiment where the distance between the light-mixing panel 5 and the light-emitting panel 1 is 0.6 mm. Approximately 9.5% of the light losses can be attributed to absorption and scattering in the reflecting ellipse. As the ratio a/b decreases (a flatter ellipse), the losses increase as a result of the fact that the risk that light beams originating from the light-mixing panel 5 are fed back to the light-mixing panel 5 increases. It is noted that, in said experiments, the opening between the light-mixing panel 5 and the light-emitting panel was not reflecting. By providing this opening with a reflective foil, the reflection is further increased by 2%.

It will be clear that, within the scope of the invention, many variations are possible to those skilled in the art.

The scope of protection of the invention is not limited to the examples given herein. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an" in front of an element does not exclude the presence of a plurality of such elements.

What is claimed is:

1. An illumination system for illuminating a display device, which illumination system is provided with a light source (6) and a light-emitting panel (1), wherein
    the light source (6) comprises at least one light-emitting diode,
    the light-emitting panel (1) comprises a front wall (2), a rear wall (3) situated opposite said front wall, and at least one light-transmitting edge area (4),
    and the light-transmitting edge area (4) is situated between the front wall (2) and the rear wall (3) of the light-emitting panel (1), characterized in that
    the illumination system comprises a light-mixing panel (5) for mixing light originating from the light source (6),
    the light-mixing panel (5) being provided with a light input edge area (7) for coupling light originating from the light source (6) into the light-mixing panel (5), and with a light output edge area (8) for coupling light out of the light-mixing panel (5),
    in operation, light originating from the light source (6) being incident on the light input edge area (7) of the light-mixing panel (5) and spreading in the light-mixing panel (5),
    a light-transport chamber (9) for transporting light from the light-mixing panel (5) to the light-emitting panel (1) being situated between the light-mixing panel (5) and the light-emitting panel (1), and
    the light-mixing panel (5) and the light-emitting panel (1) being arranged so as to extend substantially parallel to each other.

2. An illumination system as claimed in claim 1, characterized in that the light transport chamber (9) comprises an elliptically shaped, reflective inner wall (10).

3. An illumination system as claimed in claim 1, characterized in that the light transport chamber (19) comprises two light-transmitting prisms (20, 20').

4. An illumination system as claimed in claim 1, characterized in that the light-transport chamber (29) comprises a faceted, reflective inner wall (30).

5. An illumination system as claimed in claim 1, characterized in that a light-collimating element for coupling light originating from the light source into the light-mixing panel (5) is situated between the light source (6) and the light-mixing panel (5).

6. An illumination system as claimed in claim 1, characterized in that the light-mixing panel (5) narrows in a direction facing away from the light output edge area (8).

7. An illumination system as claimed in claim 1, characterized in that the light source (6) comprises at least three light-emitting diodes (6B, 6G, 6R) with a first, a second and a third light emission wavelength, which light emission wavelengths are different.

8. An illumination system as claimed in claim 7, characterized in that the light source (6) associated with the light input edge area (7) of the light-mixing panel (5) comprises clusters of blue, green and red light-emitting diodes (6B, 6G, 6R).

9. An illumination system as claimed in claim 1, characterized in that the light-mixing panel (5) comprises a first and a second part (51, 52), having a respective first and second light input edge area (71, 72) and a first and second light output edge area (81, 82) and in that a first and second light-transport chamber (91, 92) for transporting light from the respective first and second light-mixing panel part (51, 52) to the light-emitting panel (1) being situated between the respective first and second light-mixing panel part (51, 52) and the light-emitting panel (1).

10. An illumination system as claimed in claim 9, characterized in that the light source (6) is common to the first and second light-mixing panel part.

11. An illumination system as claimed in claim 9, characterized in that the light source (6) comprises a first and a second section (61, 62) coupled to the respective first and second light input edge area (71, 72).

12. A display device comprising an illumination system as claimed in claim 1.

13. A display device as claimed in claim 12, wherein the display device comprises a liquid crystal display (12).

14. An illumination system for illuminating a display device, which illumination system is provided with a light source (6) and a light-emitting panel (1), wherein the light source (6) comprises at least one light-emitting diode, the light-emitting panel (1) comprises a front wall (2), a rear wall (3) situated opposite said front wall, and at least one light-transmitting edge area (4), and the light-transmitting edge area (4) is situated between the front wall (2) and the rear wall (3) of the light-emitting panel (1), the illumination system comprises a light-mixing panel (5) for mixing light originating from the light source (6), the light-mixing panel (5) being provided with a light input edge area (7) for coupling light originating from the light source (6) into the light-mixing panel (5), and with a light output edge area (8) for coupling light out of the light-mixing panel (5), in operation, light originating from the light source (6) being incident on the light input edge area (7) of the light-mixing panel (5) and spreading in the light-mixing panel (5), a light-transport chamber (9) for transporting light from the light-mixing panel (5) to the light-emitting panel (1) being situated between the light-mixing panel (5) and the light-emitting panel (1), and the light-mixing panel (5) and the light-emitting panel (1) being arranged so as to extend substantially parallel to each other, characterized in that the light transport chamber (9) comprises an elliptically shaped, reflective inner wall (10).

15. An illumination system as claimed in claim 14, characterized in that the first focus ($f_1$) of the ellipse is situated in or at least near the light output edge area (8) of the light-mixing panel (5), and the second focus ($f_2$) of the ellipse is situated in or at least near the light-transmitting edge area (4) of the light-emitting panel (1).

16. An illumination system as claimed in claim 14, characterized in that the ratio of half the length (a) of the short axis of the ellipse to half the length (b) of the long axis of the ellipse lies in the range from $$0.4 \leq \frac{a}{b} \leq 1.$$

17. An illumination system as claimed in claim 16, characterized in that the ratio of half the length (a) of the short axis of the ellipse to half the length (b) of the long axis of the ellipse lies in the range from $$0.8 \leq \frac{a}{b} \leq 1.$$

18. An illumination system as claimed in claim 15, characterized in that the inner wall (10) of the light transport chamber (9) is at least substantially circular in shape, the center of the circle being situated between the light output edge area (8) of the light-mixing panel (5) and the light transmitting edge area (4) of the light-emitting panel (1).

* * * * *